United States Patent [19]

Erdmannsdörfer et al.

[11] Patent Number: 5,417,848
[45] Date of Patent: May 23, 1995

[54] COALESCENCE SEPARATOR WITH CHANGEABLE COALESCENCE ELEMENT

[75] Inventors: Hans Erdmannsdörfer, Ludwigsburg; Gerd Kappus, Speyer; Eberhard Kolitz, Bietigheim-Bissingen, all of Germany

[73] Assignee: Filterwerk Mann & Hummel GmbH, Germany

[21] Appl. No.: 115,638

[22] Filed: Sep. 3, 1993

[30] Foreign Application Priority Data

Sep. 4, 1992 [DE] Germany .................. 42 29 653.6
Jan. 16, 1993 [DE] Germany .................. 43 01 086.5

[51] Int. Cl.⁶ .................. B01D 17/12; B01D 21/24
[52] U.S. Cl. .................. 210/86; 210/232; 210/519; 210/DIG. 5
[58] Field of Search .................. 210/86, 232, 234, 299, 210/503, 505, 519, 521, DIG. 5, DIG. 17, 513

[56] References Cited

U.S. PATENT DOCUMENTS

| | | | |
|---|---|---|---|
| 3,048,275 | 8/1962 | Headrick | 210/DIG. 5 |
| 4,053,414 | 10/1977 | in'tVeld | 210/117 |
| 4,335,001 | 6/1982 | Yves et al. | 210/708 |
| 4,650,581 | 3/1987 | Angles et al. | 210/398 |
| 4,869,814 | 9/1989 | Hughes et al. | 210/519 |

FOREIGN PATENT DOCUMENTS

| | | | |
|---|---|---|---|
| 319713 | 5/1992 | European Pat. Off. | 210/299 |
| 2652632 | 6/1977 | Germany | 210/299 |
| 2800344 | 7/1978 | Germany | 210/299 |

OTHER PUBLICATIONS

Beko Bruchure "Oewamat–The Clean and Safe Oil–Water Separator for Condensate" (Date Not Available).

*Primary Examiner*—Joseph W. Drodge
*Attorney, Agent, or Firm*—Evenson, McKeown, Edwards & Lenahan

[57] ABSTRACT

A coalescence separator comprises a tank with an inlet for an oil-water mixture. In the upper area of the tank, a drain is arranged for the oil collected in the tank. In the lower area of the tank, a drain is arranged for the water accumulating in the tank. The water drain is provided with an ascending pipe which ends below the oil drain. A changeable coalescence element is arranged on the bottom side of the tank and is associated with the ascending pipe through a guide body which prevents swirls in a chamber of the tank above the coalescence element. The coalescence element is easily exchanged by removal from either the upper end of the tank or from below by way of a screw mounting.

10 Claims, 3 Drawing Sheets

COALESCENCE SEPARATOR WITH CHANGEABLE COALESCENCE ELEMENT

BACKGROUND AND SUMMARY OF THE INVENTION

This invention relates to a coalescence separator, and, more particularly, to a coalescence separator comprising a tank for a supplied liquid having an inlet and an outlet, a coalescence element through which the supplied liquid flows, a drain for oil collected in the tank arranged in an upper area of the tank, and a drain arranged in a lower tank area for water accumulating in the tank, the drain for the water being provided with an ascending pipe.

During air compression by way of oil-lubricated screw compressors, a portion of the lubricating oil will necessarily also reach the compressed air. It is therefore necessary to provide an oil separator which is capable of filtering a large portion of the oil content out of the air. However, during the cooling of the compressed air, an amount of condensate liquid will again be obtained which consists to a large part of water caused by the humidity content of the air, and this water carries along a portion of the oil. The oil contained in the condensate is very finely dispersed or partially emulsified in the water.

It was found that a settling or calming-down of this condensate in corresponding tanks does not have the result that all oil precipitates on the surface and can be separated there. A treatment of this air compressor condensate is therefore absolutely necessary because it usually has a residual-oil content of from 30 mg to 200 mg per liter.

A coalescence separator of the above-mentioned type is described in EP 319 713 (A2). This known separator has a tank for liquid with an inlet and an outlet. The inlet and the outlet and the liquid level in the tank are situated at approximately the same height. A filter with a coalescing effect is arranged below the inlet and the outlet. During the operation of the coalescence separator, a light liquid layer is formed above the filter which must be drained from time to time.

A disadvantage of this coalescence separator is the fact that a continuous operation is not possible because of the required cleaning intervals. In addition, because of the arrangement of the inlet and the outlet in the upper area of the separator, a very strong swirling of the fed liquid is caused which has the result that the separated light liquid or the oil may possibly mix again with the water and therefore an optimal separation of the water and the oil will no longer be possible.

Furthermore, from the published brochure "Övamat—The Clean and Safe Oil-Water Separator for Condensate" of the Beko Kondensattechnik, a system is known for the separating of the oil in which the dispersed or slightly emulsified oil constituents are to be adsorbed by an activated carbon filter. A disadvantage of this system is the fact that the service life of the activated carbon depends, on one hand, considerably on the degree of dispersion or emulsification of the oil in the water, and the filter must therefore be exchanged frequently. Also, because of the arrangement of the water drain in the area of the oil drain, there is the risk that in the case of a faulty handling, oil may reach the water drain and therefore significantly impair the effect of the system. Moreover, activated carbon cannot adsorb emulsion droplets. These droplets deposit, if they deposit at all, on the exterior structure of the activated-carbon particles.

DE-OS 28 00 344 describes a process and an arrangement for separating emulsions by way of coalescence. In a tank, a coalescing bed is provided which is further developed in a lengthening by a hydrophobic material lining. While the draining of the cleaned water takes place in the lower area of the tank and is guided via an ascending pipe, the drain for the separated oil is arranged in the upper area of the tank. A disadvantage of this arrangement is the fact that the exchange of the coalescing bed requires very high expenditures and a complete emptying of the tank is required. In addition, fed air contributes to a swirling of the layers which may lead to a subsequent mixing of the separated media.

It is therefore an object of the present invention to provide a coalescence separator which is maintenance-free and permits a simple exchange of the coalescence element, in which case a swirl-free method of operation results in a high efficiency and therefore in a very high degree of separation.

This object is achieved in accordance with the present invention by arranging the coalescence element on the tank and configuring the element as a change element, and also by providing a guide body in the tank to which an ascending cylinder is connected, with the ascending cylinder extending to an area of the liquid level.

It is a significant advantage of the invention that it is ensured in any operating mode that no oil can reach the water outlet. This advantage is achieved by the fact that, on one hand, the water drain is arranged in the lower area of the tank for the liquid and is equipped with an ascending pipe, and on the other hand, achieved by the arrangement of the oil drain which is situated above the upper edge of the ascending pipe. Since oil is lighter than water, it is ensured that no water can reach the oil drain.

Even when it is assumed that no oil is situated in the liquid tank, because of the communicating pipes, this water level will rise only to the maximum height, corresponding to the height of the ascending pipe, with a rising water level.

It is another advantage of the present invention that the separator operates in a maintenance-free manner. No exchange of any filter elements (such as, for example, activated carbon filters) is necessary. The coalescence element, which consists of a fine fiber (e.g., of a microfiber glass winding) does not require cleaning, unless other constituents to be filtered out reach the coalescence separator, in addition to the water or the emulsion.

If air is carried along with the emulsion, as might occur when compressors are used, there will be no impairment of the function of the coalescence separator because the ascending liquid flow and the air bubbles will be guided upward in a targeted manner in the area of the liquid that is close to the center.

The arrangement of the inlet for the emulsion in the lower area of the tank and the arrangement of the oil outlet in the upper area of the tank is another advantageous feature which also prevents a swirling together of the liquids.

Yet another advantage of the present invention is the avoidance of any electrical sensors which are normally provided for the outlet of the floating oil or the outlet of the remaining liquid mixture. Specifically, the use of such sensors is critical on a coalescence separator because they become dirty very easily and are therefore impaired in their operability.

According to a further embodiment of the present invention, the coalescence element is provided with a guide body on its upper end on which the oil droplets will rise which are formed on the coalescence element. This guide body assures that the oil droplets cannot swirl in the lower area of the tank for the liquid and can be discharged together with the collected water via the ascending pipe. By way of the guide body, the oil droplets are guided into the separating zone and can rise to the liquid surface.

Another advantageous aspect of the present invention is the provision of a boundary layer measuring probe for the determination of the maximal oil content in the liquid filter. By virtue of this probe, a monitoring of the oil quantity that is maximally permissible in the tank can be carried out, in which case an analysis unit is arranged behind the measuring probe and generates a signal as soon as the maximal oil quantity is exceeded.

Another advantageous feature of the present invention is distinguished by the fact that an ascending cylinder is arranged in the tank for the liquid. This ascending cylinder follows the guide body and consists, for example, of a wire netting. The ascending cylinder removes air bubbles, which are still carried along in the condensate, in the upward direction without any swirling.

BRIEF DESCRIPTION OF THE DRAWINGS

These and other objects, features and advantages of the present invention will become more readily apparent from the following detailed description of currently preferred embodiments when taken in conjunction with the accompanying drawings wherein.

DETAILED DESCRIPTION OF THE DRAWINGS

Figure 1:
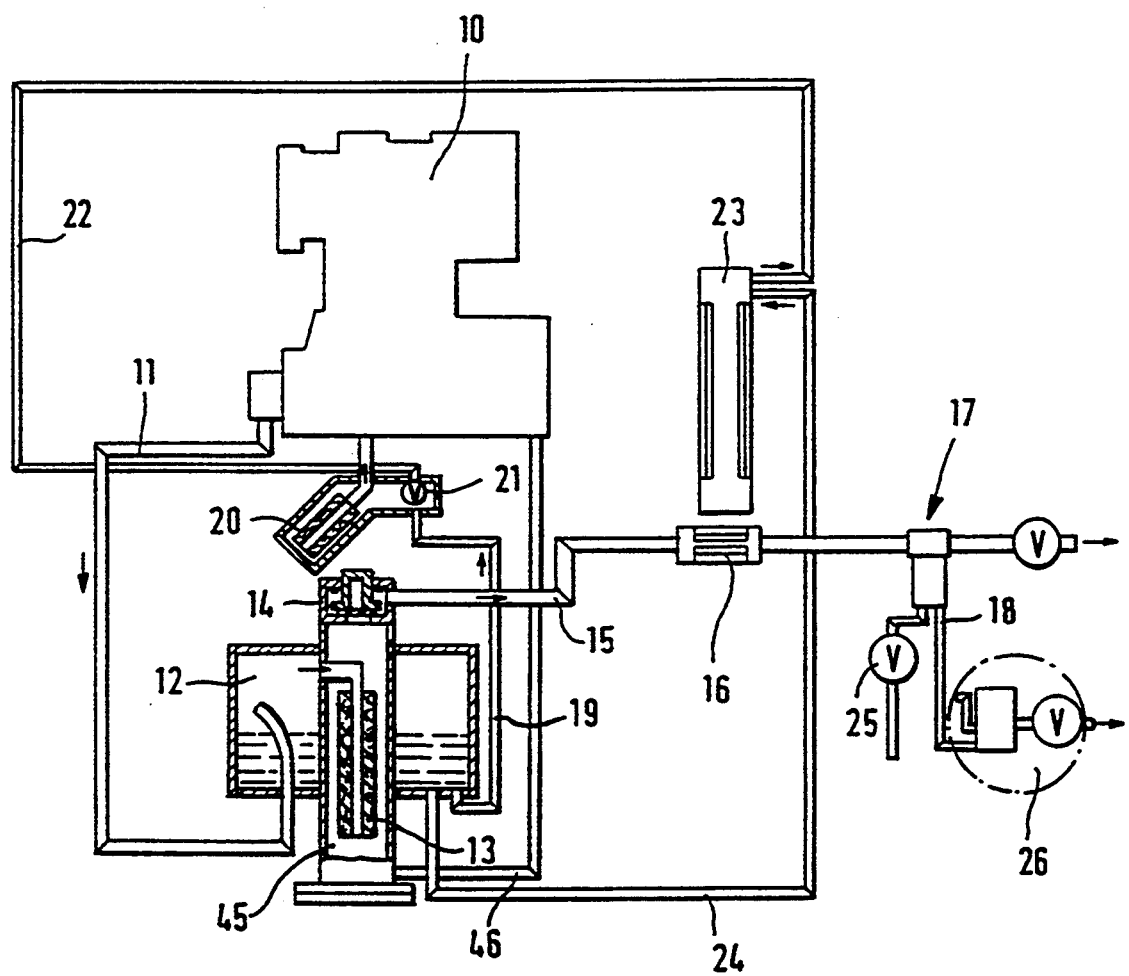
FIG. 1 is a schematic view of the overall system for the production of oil-free compressed air.

The overall system according to FIG. 1 illustrates a compressor 10 which is indicated here only in schematic form and may, for example, have a screw compressor element for generating compressed air. By way of pipe 11, the compressed air generated by the compressor 10 will reach a tank 12 which comprises an air de-oiling element 13. This air de-oiling element 13 is constructed in the form of a filter. The air flows through the element 13 from the interior side to the exterior side. The oil droplets contained in the air or the oil mist deposit in the element 13 and collect on the bottom of the partial tank 45 and are fed to the compressor 10 by way of the return flow pipe 46.

By way of the minimum pressure valve 14, the compressed air reaches the pipe 15 which leads to an air cooler 16. A condensate separator 17 is connected behind the air cooler. The condensate, which is separated in the condensate separator 17 and consists of oil and water (or emulsion), by way of the pipe 18, reaches a device 26 for dividing the condensate which will be described below. The oil collected in the tank 12 is fed to an oil filter 20 by way of pipe 19. From this oil filter 20, the oil returns into the lubricating circulation system of the compressor 10.

A switch valve 21 is also arranged on the oil filter 20, and closes and opens a pipe 22 which leads to the oil cooler 23. The inlet of the oil cooler 23 is connected with the tank 12 by way of the pipe 24. If the temperature of the oil in the tank 12 rises above a specific maximal temperature, the valve 21 is switched from its momentary position into a position which closes of the pipe 19 so that the oil collected in the tank 12 is guided by way of the pipe 24 and the oil cooler 23 to the oil filter 20, and therefore an effective cooling of the oil can be achieved.

Figure 2:
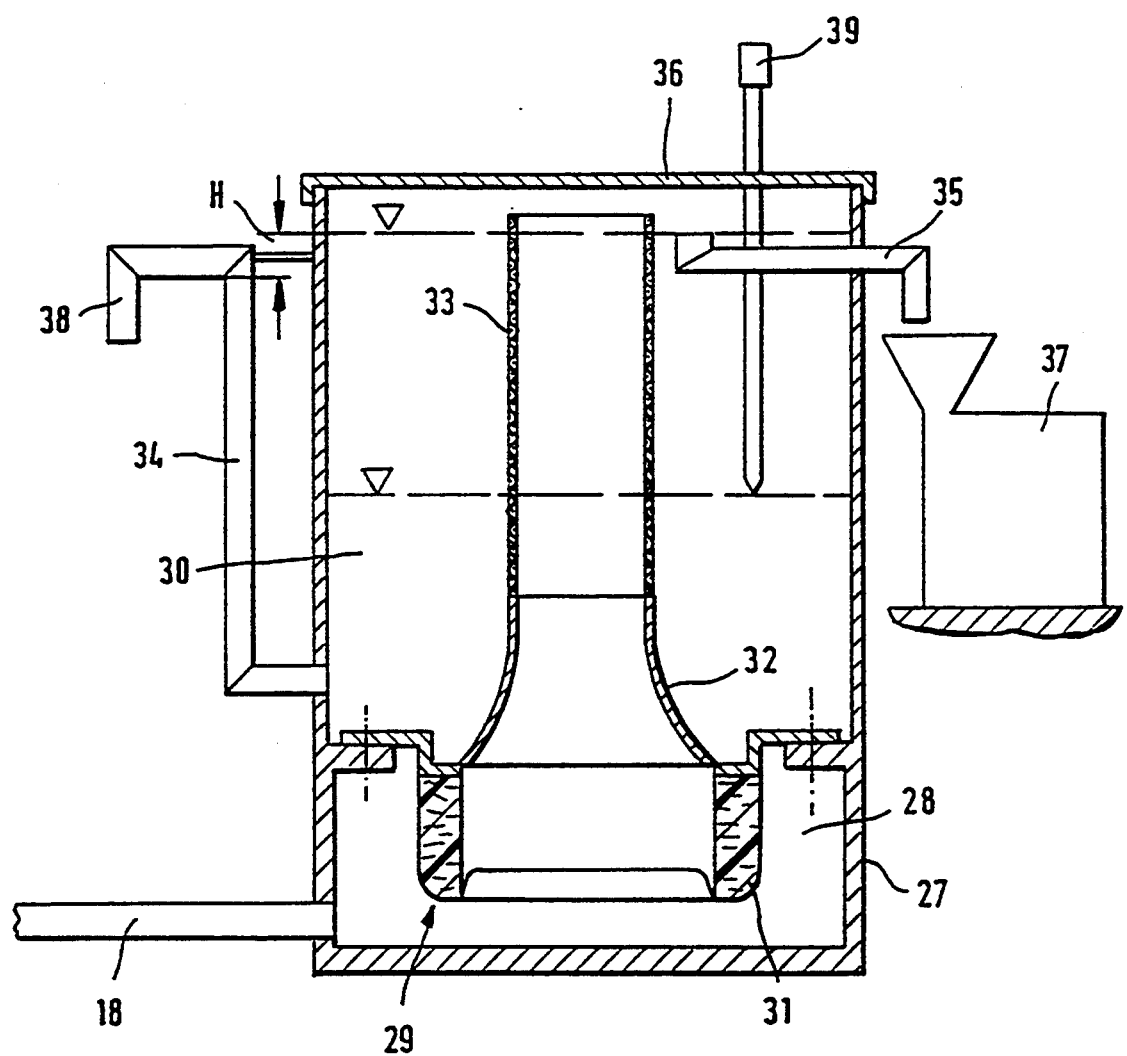
FIG. 2 is a cross-sectional elevational view of a device for separating the condensate used in the system at the location shown by the dot-dash circle in FIG. 1.

The condensate separator 17 is provided with a drain valve 25. When the entire system is stopped, this drain valve 25 can be opened and used as an additional condensate drain. Normally, the condensate separated in the condensate separator 17 is fed, by way of pipe 18, to a device 26 for dividing the condensate. This device 26 is explained in more detail with respect to FIG. 2 which shows a tank 27 for liquids. Above its bottom, the tank 27 has the pipe 18 through which the oil water emulsion or the condensate is fed. The lower chamber 28 of the tank 27 is separated with respect to an upper chamber 30 by way of a filter element 29 consisting of a concentrically arranged coalescer fabricated, for example, of a microfiber glass winding, through which, the condensate flows into the upper chamber 30. During the passage through the filter element 29, the oil situated in the condensate forms larger drops, i.e., it coalesces. The larger drops collect on the outlet side on the microfiber glass winding 31 and, when they have a sufficient size, are taken along by the flow into the upper chamber 30.

The inlet into the upper chamber 30 is provided with an open-top guide body 32 which avoids swirls in the upper chamber 30. An ascending cylinder 33 is arranged above the guide body 32 and consists of a wire netting or wire sieve. In the lower area of the top cylinder 30, the water overflow 34 is situated in the form of a bent pipe. An oil drain 35 is situated in the upper area of the tank. The upper edge of the oil drain 35 has a height difference H to the lower edge of the water overflow 34. This height difference H is a function of the oil storage capacity of the tank and amounts, for example to 10 mm.

The liquid tank 27 is provided with a cover 36. The oil drain 35 leads to an oil tank 37 which may be emptied from time to time. Of course, it is also possible to connect the oil drain 35 directly to the oil circulating system of the overall arrangement. The water overflow 34 is, for example, connected to a drain pipe (not shown), in which case a siphon effect must be prevented by a suitable venting or interruption of the pipe. The diameter of the liquid tank depends on the occurring quantity of condensate per time unit. It is self-evident that the diameter will be selected such that the flow velocity of the water in the downward direction, thus, in the direction of the water drain, is lower than the lifting velocity of the oil drops.

Figure 3:
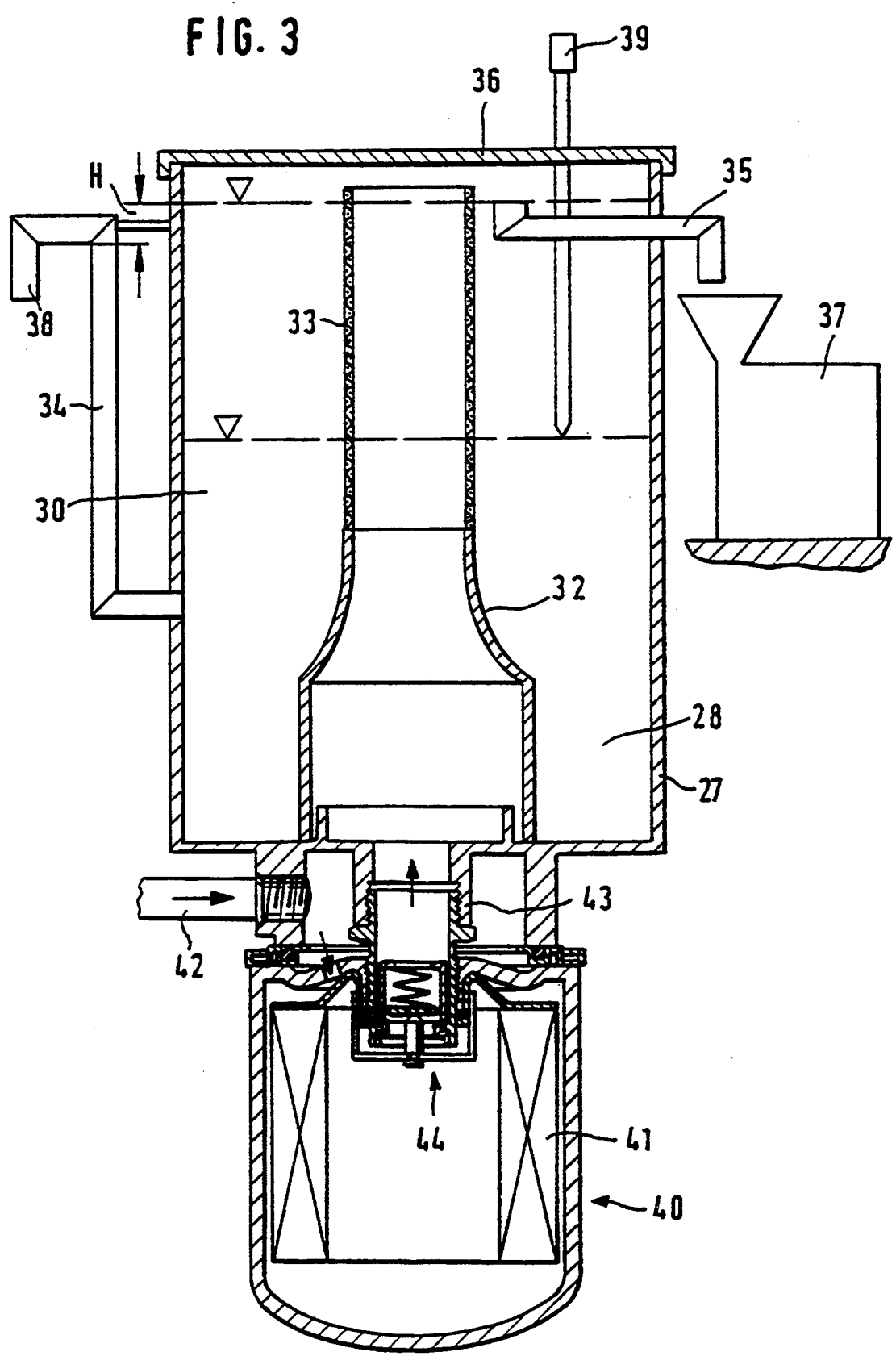
FIG. 3 is a cross-sectional elevational view of another embodiment of the device for separating the condensate in the system of FIG. 1.

The alternative embodiment for the dividing of condensate according to FIG. 3 has as a significant difference a filter element of a different type. This element is constructed in the form of a change filter 40. A microfiber glass element 41 is situated in this change filter 40 which is suitable for separating the emulsion fed by way of the pipe 42; i.e., combining the oil contained in it into larger oil drops which are then introduced by the flow of the liquid from the microfiber glass element 41 into the tank 27 for the liquid.

The change filter 40 is fastened to a screwed flange 43 and can be mounted or demounted manually or by way of a tool. So that, during the removal of the change filter 40, no liquid can flow out of the liquid tank 27, a valve 44 is provided. This valve is either closed automatically when the change filter 40 is released or is closed manually before the release of the change filter. The automatic actuating of the valve 44 takes place, for example, by the fact that, on the basis of the screwing motions of the change filter, a mechanical element is set into operation which actuates the valve in a known manner.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A coalescence separator, comprising a tank having an inlet at a lower end of the tank for a supplied liquid, a coalescence element changeably arranged in the tank such that the supplied liquid flows therethrough, a drain for oil collected in the tank arranged in proximity to an upper end of the tank, a drain arranged in a lower tank area for water accumulating in the tank and provided with an ascending pipe such that the drain for the oil is situated above an end of the ascending pipe, an ascending cylinder extending to a liquid level in the tank, and a guide body operatively connected between the coalescence element and the ascending cylinder, wherein the coalescence element is configured and arranged to be removable from one of the upper end and the lower end of the tank separate from the guide body and the ascending cylinder.

2. The coalescence separator according to claim 1, wherein the coalescence element is approximately cylindrical and liquid flow therethrough occurs from an outside surface thereof to an inside surface thereof, the coalescence element having a closed bottom and an open top face.

3. The coalescence separator according to claim 1, wherein the oil drain ends above the ascending pipe as a function of the oil storage capacity of the tank.

4. The coalescence separator according to claim 3, wherein the oil drain ends approximately 10 mm above the ascending pipe.

5. The coalescence separator according to claim 4, wherein the coalescence element is approximately cylindrical and liquid flow therethrough occurs from an outside surface thereof to an inside surface thereof, the coalescence element having a closed bottom and an open top face.

6. The coalescence separator according to claim 1, wherein a boundary layer measuring probe configured to determine maximal oil content is operatively arranged in the tank.

7. The coalescence separator according to claim 1, wherein the coalescence element is made of a microfine fiber material.

8. The coalescence separator according to claim 1, wherein the ascending cylinder is made of a wire netting and ends above a maximal filling level of the tank.

9. The coalescence separator according to claim 1, wherein the tank has a connecting head in which the inlet is provided, and the changeably arranged coalescence element is removably arranged at the connecting head.

10. The coalescence separator according to claim 1, wherein a valve is arranged between the changeably arranged coalescence element and the tank, and is operable to be closed upon removal of the coalescence element.

* * * * *